United States Patent [19]
Prestel

[11] Patent Number: 4,725,764
[45] Date of Patent: Feb. 16, 1988

[54] SWITCH ARRANGEMENT

[75] Inventor: Fritz Prestel, Hausen a. Tann, Fed. Rep. of Germany

[73] Assignee: BSG-Schalttechnik GmbH & Co.KG, Balingen, Fed. Rep. of Germany

[21] Appl. No.: 844,863

[22] Filed: Mar. 27, 1986

[30] Foreign Application Priority Data

Apr. 1, 1985 [DE] Fed. Rep. of Germany ....... 3511893
Apr. 1, 1985 [DE] Fed. Rep. of Germany ....... 3511895

[51] Int. Cl.$^4$ .............................................. H02P 5/16
[52] U.S. Cl. .................... 318/305; 318/484; 318/261
[58] Field of Search .............. 318/54, 56, 57, 60, 318/63, 65, 86, 87, 88, 258, 261, 269, 273, 274, 280, 282, 283, 284, 285, 286, 291, 293, 295, 299, 300, 302, 303, 304, 305, 370, 371, 373, 374, 375, 380, 739, 741, 757, 758, 759, 760, 761, 764, 765, 376; 366/601

[56] References Cited

U.S. PATENT DOCUMENTS

| | | | |
|---|---|---|---|
| 2,912,632 | 11/1959 | Turtil | 318/261 |
| 3,280,401 | 10/1966 | Cook et al. | 318/269 |
| 3,548,276 | 12/1970 | Gross | 318/380 X |
| 3,628,112 | 12/1971 | Gross | 318/261 X |
| 3,689,812 | 9/1972 | Eisele | 318/380 X |
| 3,794,898 | 2/1974 | Gross | 318/258 X |
| 3,965,404 | 6/1976 | Petersen | 318/261 |
| 4,104,571 | 8/1978 | Gurwicz et al. | 318/375 X |
| 4,124,812 | 11/1978 | Naito et al. | 318/371 |
| 4,288,728 | 9/1981 | Niimi et al. | 318/373 X |
| 4,388,573 | 6/1983 | Horiuchi et al. | 318/376 |
| 4,422,021 | 12/1983 | Schwarz | 318/261 X |
| 4,454,459 | 6/1984 | Huber | 318/484 X |
| 4,459,522 | 7/1984 | Huber | 318/293 |
| 4,543,515 | 9/1985 | Suzuki | 318/280 X |
| 4,551,660 | 11/1985 | Suzuki | 318/280 X |
| 4,556,831 | 12/1985 | Sakamoto et al. | 318/261 X |

Primary Examiner—William M. Shoop, Jr.
Assistant Examiner—Paul Ip
Attorney, Agent, or Firm—McAulay, Fields, Fisher, Goldstein & Nissen

[57] ABSTRACT

In connection with a switch arrangement for circuit-making and circuit-breaking, as well as for controlling the speed of, electric machines it is proposed to provide a double-pole circuit-maker and circuit-breaker safety switch and to connect it in series with the motor connections in such a manner that in a first switching position of the double-pole safety switch the connection to mains is established while in the other switching position at least one motor field winding is short-circuited with the armature winding by an actuating element provided in common for the two partial change-over switches, by changing the polarity for instantaneous braking, there being provided a separate speed-setting selector switch which can be operated independently of the saftey switch and which is designed to permit presetting of a motor cut-out position which enables the motor to run out freely when the safety switch does not respond separately or when the device is not opened to cause the safety switch to respond.

19 Claims, 10 Drawing Figures

SWITCH ARRANGEMENT

BACKGROUND OF THE INVENTION

The present invention starts out from a switch arrangement according to the preamble of the main claim. It has been known in connection with the speed control of electric machines, in particular portable machines, electric hand tools, bench machines, or the like, and/or in circuit arrangements for switching such machines on and off, to provide so-called phase controls comprising an a.c. switch, usually a two-way triac connected in series with the electric motor whose speed or behavior is to be controlled, regulated or influenced. Such triac drives have been known in various forms and are frequently available already for the desired applications in the form of pre-fabricated components, the latter comprising integrated circuits, i.e. ICs, which then perform the desired functions with the aid of additional external wiring arrangements.

It has further been known to connect in series with the electric motor driving the respective tools or systems additional circuit-maker and circuit-breaker means and a load resistance for picking up the current flowing through the triac and, thus, also through the electric motor, and utilizing it for control purposes, for example for realizing a constant speed regulation which may be adjustable either continuously or in steps.

The arrangement for driving such switch arrangements or speed controls from the outside may be designed in such a manner that only a single actuating element has to be displaced by the operator. The arrangement may be such that initially a switch has to be actuated whereafter a slide can be displaced along a potentiometer (for example by displacing the actuating element), so that the IC is supplied with different impedance values in the control circuit of the triac for controlling the speed, and is thereby placed in a position to preset different speeds and to maintain the latter thereafter by appropriate full-wave control, if necessary also with load compensation.

It may be problematic in such controls and circuits that the integrated component, i.e. the IC, may heat itself up in which case the controlled value may vary more or less, even if the external wiring arrangement remains constant. Reference is made in this connection, as an example for a plurality of other components, to the integrated circuit U 210 B from Messrs. Telefunken which may be used as speed control element with load current compensation, in which case this integrated component can be adapted to the particular motors used and the required functional conditions by appropriate selection and combination of the values of the components used for the supplementary external wiring arrangement. The speed control is effected via a speed setting element taking the form of a potentiometer. Although the application sheets issued by the manufacturer for the circuit U 210 B do not show an external main switch, such a switch could of course be arranged if desired.

It is very frequently desired in this connection to design certain electrically driven devices in such a manner that an automatic momentary stop action (braking of the motor by shorting of the field and armature windings) becomes active when the device is opened and the user would otherwise risk to get into dangerous contact with quickly rotating parts. This is why certain types of equipment, as for example food processors, are designed from the very beginning in such a manner that the device cannot be opened at all unless it is switched off before, in which case the opening action is released mechanically or in any other suitable manner when the device is switched off, while at the same time the before-mentioned short-circuit is initiated for stopping the device immediately. To say it in other words: The device cannot be switched off and then opened in any other manner but by actuating the momentary stop circuit (braking circuit). The fact that this is the only possibility is, however, disadvantageous because it cannot be excluded that these constant momentary braking operations which can give rise to very considerable short-circuit currents, depending on the phase position and speeds, may lead to damage to the switches (burning) and/or to the armature carbons and/or the collector segments, which may even result in welding. The constant momentary braking actions produced by short-circuits have, therefore, a particularly adverse effect on the service life of such devices. In this connection, it should be said that there have been known even devices which cannot be switched on or off at all but with the aid of a combined main and safety switch which, being partly of very complicated design, connects the electric motor of a food processor, or the like, to mains when the device is closed or the lid is applied, and disconnects the motor from mains and initiates simultaneously the short-circuit braking action, in some cases via mechanical connecting parts, when the lid is removed.

Two-pole change-over switches or on/off switches have been generally known (DE-OS No. 32 20 189), for example in the form of a potentiometer-and-switch combination wherein snap switches with their respective switching levers are arranged on both sides of the tapping paths of a linear potentiometer which is arranged directly on a carrier plate in a manner such that when one of the slides supporting the wiper of the potentiometer is displaced, the said slide can actuate rear faces of the switch lever mirror-symmetrically when the slide has reached a pre-determined switching position, thus establishing double-pole electric contacts. The simultaneous reversal of the two snap switches requires in this case a common sliding element which for the potentiometer is arranged for sliding displacement on the carrier board; certain preferred reversing operations of the two jointly connected double-pole snap switches have, however, not been mentioned in the said publication.

It has been further known in connection with the snap switch (DE-PS No. 28 02 133) to mount the carriers supporting the contact pieces and a wiper carrier directly on a first surface of a circuit board or print board and to fix them by means of extensions formed integrally with the said carrier or holding parts and extending to the opposite side of the circuit board where they are soldered, one of the holding parts carrying simultaneously the wiper and its actuating element.

Such a snap switch is, however, suited only for single-pole circuit-making or reversing.

Now, it is the object of the present invention to improve the switch arrangement described at the outset in such a manner that the least possible wear is encountered on switches and, in particular, in the area of the carbons/collector of the electric motor, during switching-on and off and/or speed control, and simultaneously a switch arrangement with two-pole reversal is provided for use in this connection.

ADVANTAGES OF THE INVENTION

The switch arrangement according to the invention achieves this object with the aid of the characterizing features of the main claim and offers the advantage that a pre-set constant speed can be maintained in a particularly sensitive manner and that influences resulting from load compensation can be balanced by appropriate selection of the circuit element which is connected directly with the IC component and which, accordingly, is in direct heat-transfer relation with the latter, and its temperature curve.

It is of particular advantage in this connection that by operating the speed setting element, the operator may select an off-position for the motor which is perceived as the natural final value, in which case the phase control reacts via the integrated component (IC) to make the motor dead. The driving electric motor may then run out, i.e. it is not brutally braked by short-circuit braking, with the particularly high stresses on the components, switches, transitions, or the like involved thereby. On the other hand, however, it is ensured that whenever a risk would actually exist for the operator, i.e. when for example the housing of a food processor is opened and there is a risk that the operator's hand may get into contact with quickly rotating parts, or the like, the momentary braking action is immediately released so that the same safety standard is maintained as in a devices which can be switched off only through short-circuit momentary braking. Thus, it is ensured by the present invention that short-circuit momentary braking occurs whenever this is required, while on the other hand no-wear circuit-breaking and running-out of the electric motor is permitted when this does not provide any risk. In this connection, it may be regarded already as an advantage that the operator will normally at first set his/her speed setting element to the off position so that a certain period of time passes, and a certain speed drop will have occurred, before the next manoeuvre on the device, i.e. before the device is opened to release the short-circuit braking action, because in view of the speed reduction the short-circuit braking action will no longer have the highly wearing effect on the involved components thanks to the lower short-circuit current encountered even at the peak of the pulse.

The features described by the sub-claims permit advantageous improvements and further developments of the switch arrangement provided by the main claim.

It is a particular advantage of the invention that a very intimate thermic relation with the IC effecting the speed control can be achieved by bonding an NTC resistor or, preferably, a diode directly to the housing of the IC and connecting its wires with the corresponding external wiring and/or inputs of the IC, there being further provided in the area of the main switch means taking the form of reversing switches designed in such a manner that the short-circuit braking effect can be realized in the other switching position. This may take place at any time, even if the rotary setting element is not previously returned to the off position.

While being simple in design, the safety brake control switch allows the actuating force to be directed on the switching lever in any desired direction (in vertical or horizontal direction relative to the circuit board on which it is mounted) and permits safe two-pole switching, it being a particular advantage that specific timing conditions can be provided for the respective switching action by appropriate selection of the type and structure of the switch according to the invention so that the switch according to the invention can be used, preferably, as a safety switch for such electric machines, and the like, which need a safety mechanism that must be actuated before the machine can be switched on by means of a separate mains switch. In this connection, a preferred application of the two-pole reversing switch according to the invention is seen in electric devices where the driving electric motor has to be stopped immediately when the safety device is removed, the quick braking effect being ensured, with low braking currents, by a simplified electric reversing operation in the motor area, but being dependent on the condition that the other pole is changed over before, in an appropriately timed relationship.

Since the two dead-center springs of the two wipers of the two-pole change-over switch are pivoted about a common switch lever, it is ensured that the switching movements can be effected in timed relationship relative to each other, the time relationship between the switching actions being determined by the arrangement of the pivot points (pivot points set off against each other) and/or the paths which each pivot point of the respective biasing or dead-center spring has to cover upon actuation of the switch lever.

Thus, a particular advantage of the invention is seen in the possibility to brake electric motors by only one two-pole change-over switch having a defined chronological switching sequence, whereby the conventional braking of universal motors, i.e. essentially by reversing the polarity of the motor armature and causing a short-circuit across the field windings, is simplified in a decisive manner and, above all, results in considerably reduced wear of the contacts of the reversing switch, the carbons and the segments of the armature.

BRIEF DESCRIPTION OF THE DRAWING

Certain embodiments of the invention will be described hereafter with reference to the drawing in which:

FIG. 4 shows a side view of the change-over switch, FIG. 4a showing a short diagram of the switching times, which are set off relative to each other, obtained when the single switch lever is (necessarily) actuated simultaneously;

FIGS. 5a, 5b, 5c show electric circuit diagrams of certain known possibilities for braking electric motors, partly with the respective curves of variation with time of the braking current, while

DESCRIPTION OF THE EMBODIMENT

Figure 1:
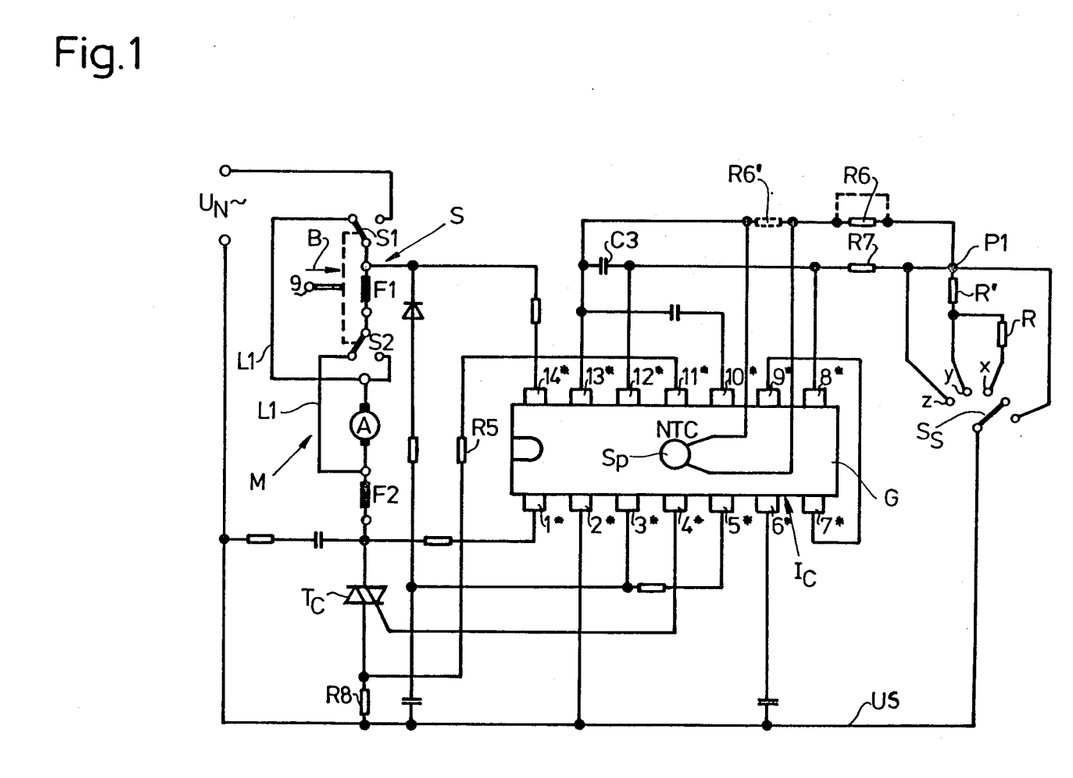
FIG. 1 shows the block diagram of a speed setting element with load compensation, using an IC component, with separate speed setting element and mains switch and the possibility of momentary short-circuit braking, and the temperature curve of the IC compensating the NTC resistor in a first circuit.
Figure 2:
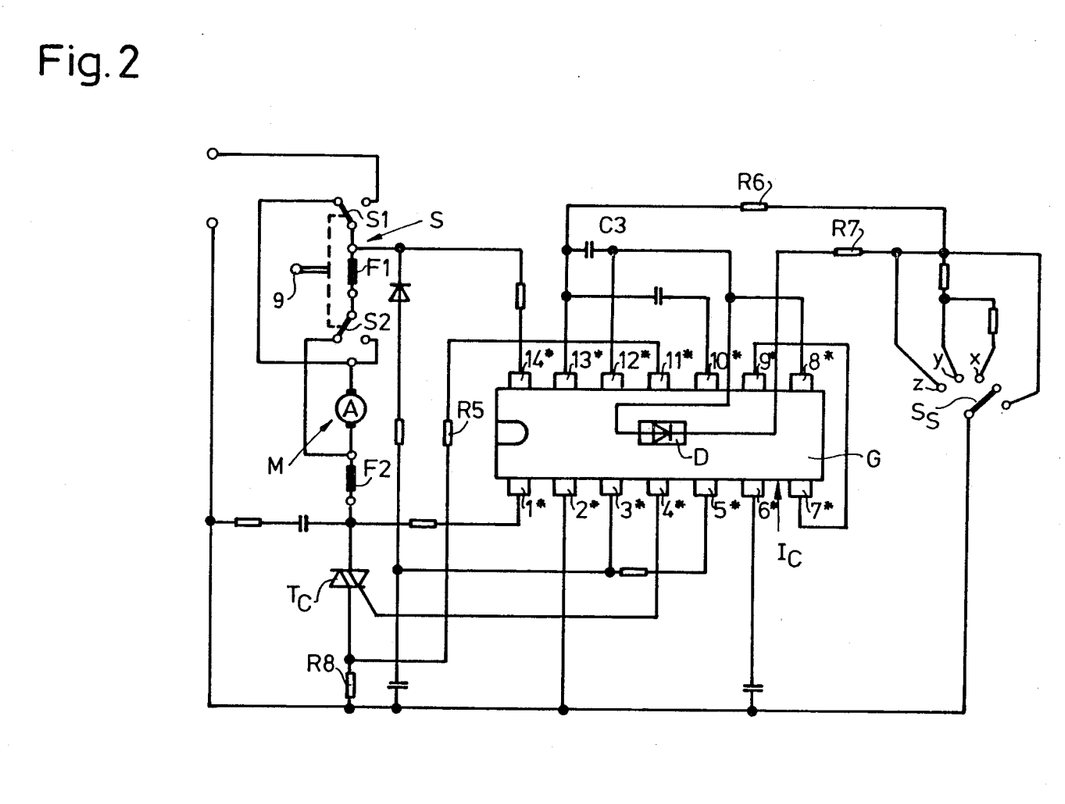
FIG. 2 shows a block diagram similar to that of FIG. 1 showing a different design in the area of the circuit element picking up and compensating the temperature variation of the IC.

The speed setting element with load compensation illustrated in FIGS. 1 and 2 has a central circuit element in the form of an integrated circuit (IC) component is commercially available, for example as Model U 210 B from Messrs. Telefunken. Its output 4* drives the Triac Tc arranged in the circuit of the electric motor M which in the drawing is indicated only by an upper field winding F1, the armature A and a lower field winding F2.

The wiring at the mains input $U_N$ is completed by a double-pole reserving switch S comprising the two single reversing switches S1 and S2 which are operated jointly at 9 via a common setting element, a cam, a switch lever, an actuating element or the like. In practical application, for example in a food processor, this element, which will be described hereafter consistently as an actuating element, may for example consist of a cam or push rod which is actuated when the lid of the food processor is removed. By closing the lid of the food processor, the actuating element is caused to move in the direction indicated by arrow B so that the two change-over switches S1 and S2 move to their other positions not shown in the representation of FIG. 1. When the lid is removed, the two switches move in a given sequence in time—this applies to both switching directions, as will be described in detail further below—into the opposite direction. FIG. 1, therefore, shows the switches S1, S2 in the momentary short-circuit braking position in which only one field winding F1, being separated on its one end from the mains, is short-circuited with the armature winding A via lines L1 and L2. It is a precondition for this momentary braking connection, which acts to brake the motor immediately by reversing the polarity of the motor armature and short-circuiting the fields across the switches S1 and S2 that, as realized according to one feature of the present invention, when switching on the unit the switch S2 is switched on first, i.e. a certain time before the switch S2 is changed over, in which case the switch S1 serves simultaneously as a master switch. When cutting-out the device or switching over to the braking position (i.e. the switch position shown in the drawing, the switch S1 must then, in the dynamical switching sequence, switch over first, i.e. a certain time before the switch S2. This condition can be verified by imagining, for example, that the switch S1 does not change its position before the switch S2 when the device is cut out or switched over to the braking condition, i.e. if one assumes theoretically that, contrary to the position shown in FIG. 1, the switch S1 was still in its "on" position. For, in this case the armature A of the motor would be shunted and the current flowing through the two field windings F1, F2 would destroy the triac Tc. A similar condition would be obtained during switching-on if the switch S1 was to establish the connection to mains before the switch S2 (a condition that should never occur).

The circuit of FIG. 1 comprises on the side of the speed setting element, instead of a potentiometer, a selector switch Ss which performs the function of a speed setting element and which can be turned from an "off" position to switching positions s, y, z corresponding to increasing speeds. The instantaneous operating position also shown in FIG. 1 can be activated momentarily by a separate axial, instead of the normal rotary, movement of the switch. Accordingly, the selector switch Ss can be turned from its "off" position to three different speed positions in which it connects the connections 8*, 12* and 13* of the integrated circuit IC with the other voltage connection (lower bus US). The integrated circuit illustrated in FIGS. 1 and 2 is capable of reacting also to changing load conditions of the motor, for which end the motor current is picked up at the shunt resistor R8 via R5 and supplied to the connection 11* of the integrated circuit IC. The integration is effected via C3. If the motor current increases due to higher loading, the voltage encountered at the capacitor C3 and, thus, also at the connection 8* (pin 8*) receiving the speed control voltage will rise, too. As a result thereof, the current flow angle picked up by the triac is also increased, whereby an excessive, or any, speed drop can be avoided. The degree of equalization of the load variation is determined by the values of the resistors R5 and, in particular, R7 which should, therefore, be adapted to the motor and/or the desired regulating properties. The elements not marked by reference numerals in the drawing need not be taken into consideration for the purposes of the description of the circuit because they do not contribute to the solution of the present invention and because, in addition, the use of integrated circuits for the external wiring arrangement has been known as such.

Accordingly, a device provided with a control circuit according to FIGS. 1 and 2 is usually operated in such a manner that after the device has been completely mounted, i.e. after the lid of a food processor, for example, has been applied, the switches S1, S2 are in their switched-over positions and the device is connected to mains. The device is then switched on separately by operating the selector switch Ss in the manner of a speed setting element, by turning the switch from its "off" position to the desired one of the speed positions x, y, z. Upon completion of the operation to be carried out by the device, the user will first of all automatically reduce the speed by turning the switch Ss over its different positions until the "off" position is reached, i.e. until the power supply to the motor M, i.e. via the triac Tc, is interrupted. The motor will now run out. However, the device may be opened at any time in which case the (unilateral) separation from mains and the momentary short-circuit braking action of the motor will be realized simultaneously by the actuating element and corresponding operation of the two switches S1, S2. Considering that the device may be opened at any time, i.e. absolutely arbitrarily, the described momentary braking action may, if necessary, take place either when the motor has already come to a standstill in which case no momentary short-circuit braking action will be initiated at all, or at any earlier point in time, but then also with largely reduced short-circuit currents so that the resulting wear is considerably reduced or no wear is encountered at all. It is a precondition for the configuration of the mains/short-circuit braking/double reversing switch S that the two partial change-over switches S1 and S2 which are jointly actuated by the actuating element perform their switching action in dynamical sequence—as shown in the diagram of FIG. 4a—, as has been described before. Switches providing such switching properties can be designed mechanically in such a manner that in cases where the actuating element for the switching-over action consists of one common component, the circuit-making movement of the one switch, in the present case S1, precedes that of the other switch, while its circuit-breaking movement lags behind that of the other switch.

Figure 3:
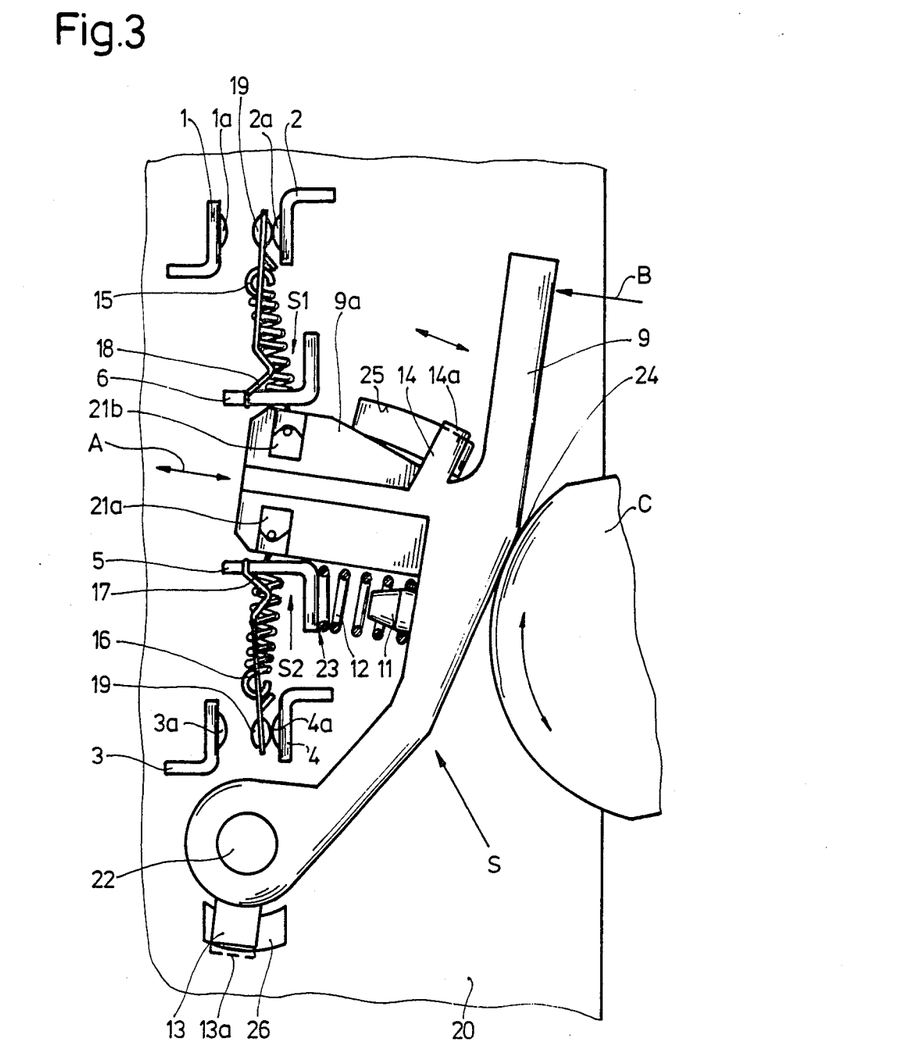
FIG. 3 shows a top view of a preferred embodiment of a two-pole change-over or circuit-breaker switch according to the invention.
Figure 4:
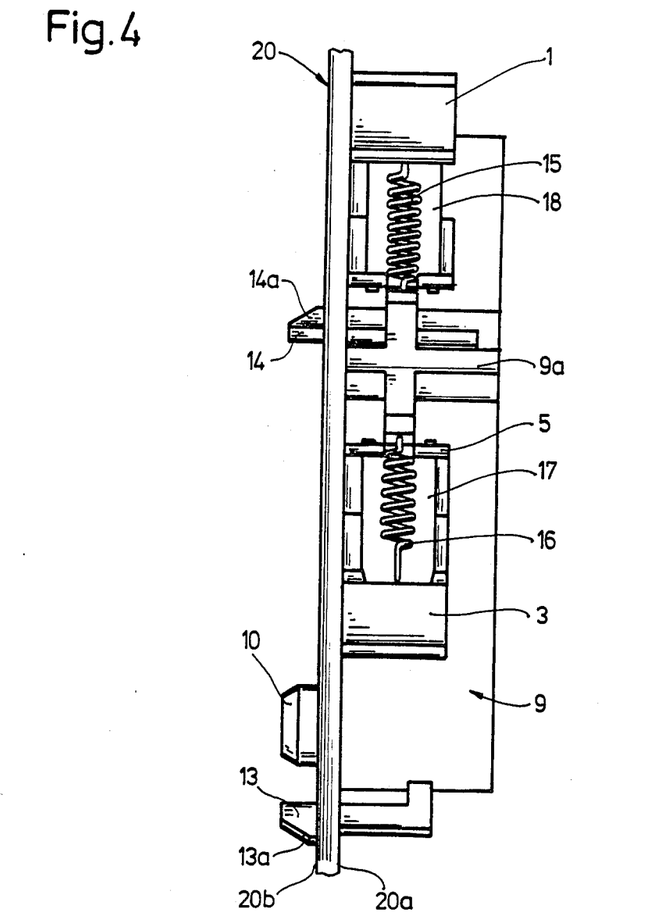
Figure 4A:
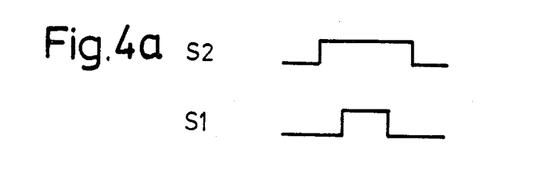

According to an advantageous embodiment illustrated in FIG. 3, the carrier or supporting material for the illustrated double-pole reversing switch S, i.e. its housing, consists of a carrier board 20 in the form of a print board, circuit board, or the like exhibiting usually a component side 20a and a conductor path side 20b (compare FIG. 4). On the equipment or component side, the circuit elements and components of the double-pole reversing switch or on/off switch S can be seen. The switch consists of the first change-over switch S1 and the second change-over switch S2 which are arranged opposite each other in such a manner that the two biasing and dead-center springs 15, 16 provided for moving the wiper in both directions are arranged on a common actuating element or switch lever 9—this term will be used consistently in the following specification—which can be acted upon from the outside of the device. There are provided bent-off carrier or holding parts 1, 2, 3, 4 consisting of a suitable, preferably metallic, material for the contact pieces 1a, 2a, 3a and 4a against which the counter contact pieces 19 provided on the respective wiper 17, 18 which can be moved between the two contact pieces 1a, 2a, 3a, 4a and holding parts 1, 2, 3, 4, respectively, come to rest in a position which is secured by a dead-center point.

The respective wiper 17, 18 is fork-shaped at its lower end because the respective dead-center spring 15, 16 passes between the two prongs of the fork. It is mounted on a separate, contact-making holding part 5, 6 in sort of a cutting-edge position so that it is easily and freely movable, and will assume the respective switching position, under the action of the associated biasing spring 15, 16 when the switch lever moves in a direction substantially along the one indicated by double arrow A. The two biasing springs 15, 16 are fastened on the wipers 17, 18 at a point remote from its pivot point and, at their other ends, received in receiving openings 21a, 2b on the switch lever 9, or more exactly on an extension 9a of the switch lever 9 projecting at a right angle therefrom.

The switch lever 9 is pivoted at 22 on the circuit board 20 by means of a rotary pin 10 (FIG. 4) extending through a corresponding opening in the circuit board so that the switch lever 9 can pivot about the pivot point 22. The switch lever itself extends from the pivot point 22 upwardly—as viewed in FIG. 3—in slightly curved shape and projects with its extension 9a, which is preferably formed as an integral part thereof, between the two reversing switches S1, S2 so that—as mentioned before—the biasing springs 15, 16 can be fastened on the said projection.

In order to secure the switching position shown in FIG. 3, the switch lever 9 is provided with a separate biasing spring 12 which bears at 13 against the holding part 5 of the one reversing switch S2 which simultaneously supports the wiper 17, and engages by its other end a given length of a safety pin 11 provided on the switch lever 9. The movement of the switch lever may, basically, be effected by any desired means, for example by linear pressure in the direction indicated by arrow B or by a rotary movement of an eccentric part C acting upon the rear face of the switch lever at 24 to cause the latter to perform a pivoting movement towards the left in FIG. 3.

The switch lever 9 is secured in position by two resilient stop elements 13 and 14 fixed to the lever, or preferably molded integrally therewith, which are provided with lugs 13a, 14a engaging the opposite side of the circuit board. The lugs of the stop elements are pressed through oblong, curved openings 25, 26 provided in the circuit board, whereupon they expand again on the side 20b of the circuit board, due to their at least partial resilience, so that the lugs 13a, 14a lock the lever in position and support it from being lifted off.

The force of the two biasing tension springs 15, 16 is selected to ensure that the required contact pressure is achieved at the points of contact in the respective deadcenter positions of the wiper.

In the embodiment shown in the drawing, the operation of the switch has the additional particularity that the switch lever 9, or more exactly its extension 9a, describes an arc of a circle around the pivot angle 22, and since the distances of the two fastening points of the springs 15 and 16 from the pivot point 22 are different, the lengths of the paths covered by them for one and the same angle of rotation of the switch lever are also different. The present invention makes use of this particularity for realizing an advantageous feature of the invention, namely for setting off in time the circuit-making and circuit-breaking points of the two switch-over switches S1, S2, preferably in the manner shown very diagrammatically in FIG. 4a.

Accordingly, the basic function of the arrangement is such that when the switch lever is moved in counterclockwise direction (from the right to the left in the drawing), the switch lever 17 will snap into the other switching position, for example the one defined as its "on" position—earlier in time, due to the different arc configurations of the switching movements of the two biasing springs, while—as appears from FIG. 4a—the switching reed 18 will perform the switching movement somewhat later, due to greater length of the path it has to cover.

During the opening movement, i.e. when the switch lever 9 moves from the left to the right, the two-pole reversing switch S operates in the reverse sense. In this case, the switch lever 18 is the first to move into its other position, i.e. it "opens" according to our definition, and the wiper 17 opens a little later.

Such a switching behavior can be employed with advantage for a device for braking any desired electric universal motors when for reasons of handling safety it is desired or required that the device can be stopped as quickly as possible after having been switched off. This requirement may, for example, exist in the case of portable tools, electric hand tools, kitchen appliances, or the like, circular saws, lawn-mowers, hedge-clippers, etc. A similar quick cut-out function or braking function is provided in very many machines also in case certain parts are removed, the device is opened, the lid is lifted off, or the like. In this case, too, the machines or appliances are immediately braked by means of circuits or other means for braking the motor which may be of a mechanical or electric type. Some examples of braking arrangements for motors are: braking motors, eddy-current brakes, d.c. brakes, or else braking by changing the polarity of the motor armature and establishing a short-circuit across the fields, or the like.

Figure 5A:
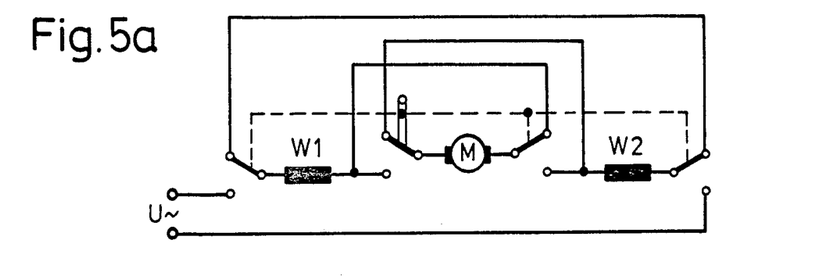
Figure 5B:
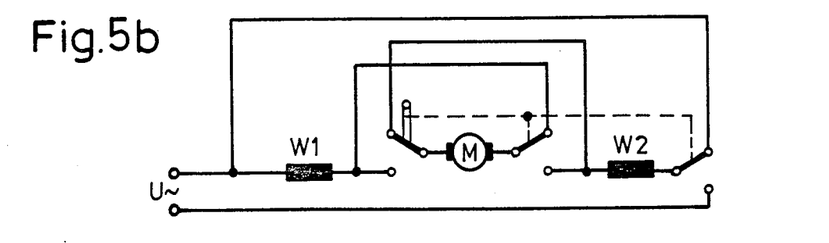
Figure 5C:
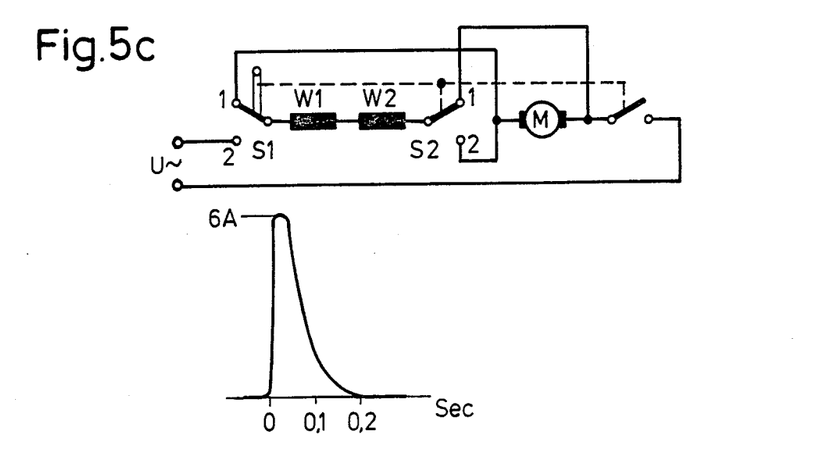

If one regards in this connection the known representations of FIGS. 5a, 5b and 5c, it is easily seen that in the case of the representation of FIG. 5a a quadruple reversing switch is required to disconnect the motor on the one hand fully from the mains and to short-circuit on the other hand the windings W1 and W2 across the armature of the motor in the switched-off position, as shown. In order to disconnect the motor from the mains on its one side and to perform the braking action with the two fields (windings W1 and W2) a triple change-over switch is required in the known representation of FIG. 5b, while according to the representation of FIG. 5c one still requires, provided the separation from the mains is complete, one double change-over switch or two-pole change-over switch and a single on/off switch in which case the armature winding must not, however, be arranged electrically between the two fields. If one can do without complete separation from the mains, only two change-over switches or one double-pole change-over switch are required in the electric circuit shown in FIG. 5c.

However, it is a common disadvantage of the circuits described before that—as appears from the diagram of FIG. 5c which shows the braking current curve as a function of time—extremely high currents are encountered, due to the generator effect developed by the motor at the moment when it is switched off and the short-circuit condition is obtained, which currents may damage by heavy wear, or even weld, not only the contacts of the required double change-over switch, but also the carbons and the segments of the motor armature.

Figure 6:
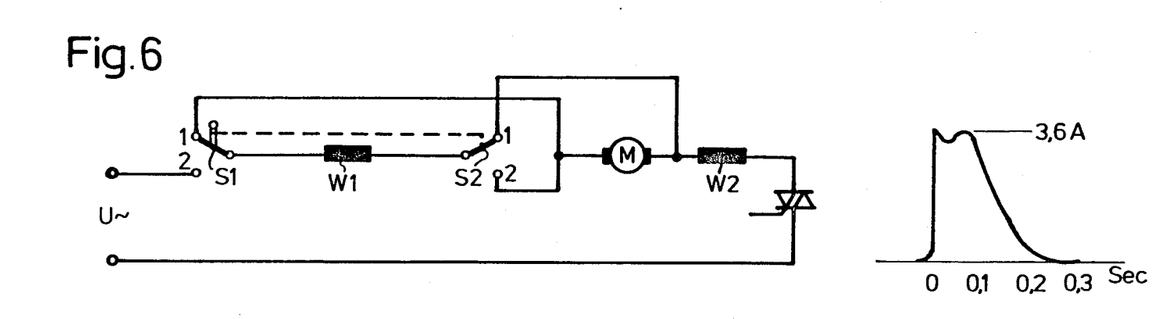
FIGS. 6 and 7 show certain special circuit arrangements of embodiments of the invention where the double-pole reversing switch is used for braking an electric motor, again with the related curves of the variation with time of the braking current.
Figure 7:
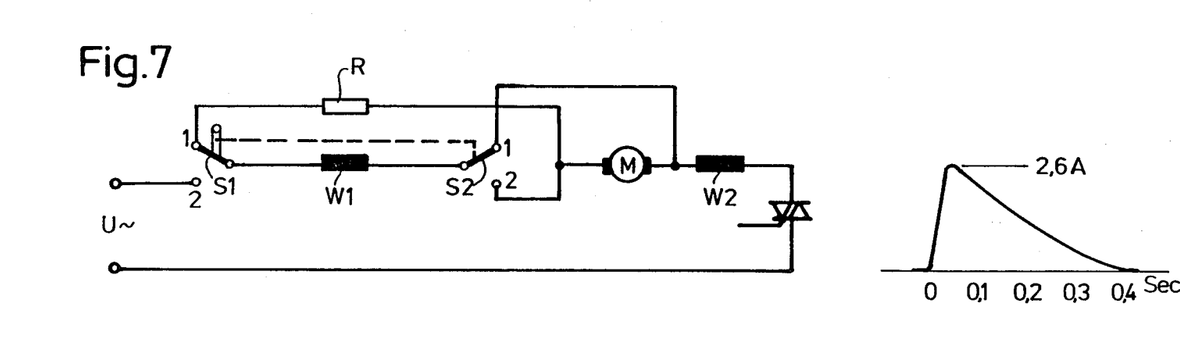

The present invention now permits these short-circuit currents to be considerably reduced without increasing the braking times notably, as appears from the diagrams, corresponding to the circuits of FIGS. 6 and 7.

The only thing required to this end is a two-pole change-over switch or circuit-breaker switch as described before. In the circuit arrangement of FIG. 6—braking with one field (winding W1) and separation from the mains on one side only—the maximum braking current peak encountered is reduced to approximately half the value of the curve shown, for example, in FIG. 5c, while—as has been proved by corresponding measurements—the braking time is extended by as little as approx. 50% which is of practically no importance if one considers that the braking times are in the range of 0.2 to 0.3 seconds. It appears, however, from the brake current curves shown in the diagrams of FIGS. 5c and 6, 7 that the current/time area is approximately equal in size. The measurements were made for this purpose with the wiring arrangements shown in FIGS. 5a, 5b, 5c as well as 6 and 7 using a 500 W motor which was stopped after 0.2 seconds in the embodiment shown in FIG. 5c and after 0.3 and 0.4 seconds, respectively, in the embodiments shown in FIGS. 6 and 7.

The circuit shown in FIG. 7 differs from that of FIG. 6 only by the arrangement of an additional resistor R in the short-circuit which permits the current to be once more considerably reduced, depending on the size of the resistor (in numerical values: from a peak current of 6 A in the embodiment of FIG. 3c to 3.6 A in the embodiment of FIG. 6 and to 2.6 A in the embodiment of FIG. 7). But even with this resistor R, which in the embodiment shown may have a value of, for example, R=24 Ohms, stopping times of the motor as short as approx. 0.5 seconds can be achieved.

However, it is a precondition for the safe operation of the circuits shown in FIGS. 5c, 6 and 7 that the action of the switch S2 precedes that of the switch S1 when switching the motor on (in FIGS. 5a, 5b, 5c, 6 and 7 all switches are shown in the braking position), and that, conversely, when switching off the motor or changing over to braking, the action of the switch S1 precedes that of the switch S2 in the manner shown in FIG. 4a, because otherwise—as can be verified—both motor fields might be directly connected to mains without the armature, which could again give rise to high current pulses that could have adverse effects on the contacts and the motor and would certainly destroy a triac used for phase control and connected in series with the motor.

A preferred field of application of the two-pole change-over or circuit-breaker switch is, therefore, seen in motor braking circuits and/or safety circuits generally because the switch according to the invention is in any case capable of separating on pole from the mains.

Further, investigations have shown that when operating the circuit according to FIGS. 1 and 2, a speed change is encountered in the integrated circuit IC, due to spontaneous heating-up or changing ambient temperatures. According to another feature of the present invention, any change in the speed resulting therefrom is balanced by direct temperature compensation in such a manner that a temperature-responsive circuit element is brought into direct heat-conductive connection with the housing G enclosing the integrated circuit IC, for example by fixing the circuit element directly to the IC, preferably by bonding it with adhesive, sealing compound or the like to the center of the housing, and that the temperature variation obtained at the electric connections of the said circuit element are utilized by connecting them to external circuit elements and/or directly with the input connections of the integrated circuit IC. Since in this manner the IC temperature is directly transferred to the compensation circuit element, the only thing that is left to be done is to select or determine the temperature variation of the said circuit element $S_T$ appropriately so as to compensate the speed-varying temperature variation of the IC.

According to a first embodiment of the invention corresponding to FIG. 1, the circuit element $S_P$ used is an NTC resistor whose connections are connected in parallel to a resistor R6' which connects the circuit point P1 on which the step contacts of the speed setting element are connected, if necessary via resistors R, R', to the other connection of the before-mentioned capacitor 3c and/or the IC connection pin 13. When such an NTC resistor was arranged in heat-conducting relationship with the IC housing, and when the system was otherwise optimized, a very small speed rise with rapid stabilization was obtained after switching-on the device under room temperature conditions, and a very slight speed drop occurred at extreme over-temperature conditions, due to the curve shape of the NTC. It was found that the influence on the speed was less in the circuit just described than in the case of the other possibility which consists in omitting the resistor R6' completely and connecting the NTC resistor in series with the resistor R6. In the case of the before-described parallel connection to the resistor R6', the resistor R6 is, preferably, completely omitted.

Particularly satisfactory embodiments of a temperature compensation are achieved when, as shown in FIG. 2, the NTC resistor is replaced by a diode D whose forward resistance varies in linear relationship with the temperature which permits in the arrangement shown in the drawing to eliminate completely any temperature variation at the beginning of the temperature rise and under extreme over-temperature conditions. All the other circuit components of FIG. 2 correspond to those shown in FIG. 1 so that they need not be described here in detail. The diode D, which is also arranged in intimate heat-conducting relationship with the housing of the IC, is connected, in the embodiment shown in FIG. 2, in series with a resistor R7 and with the other connection of the capacitor C3 (pin 12 of the IC).

By appropriately selecting one or more, then series-connected, diodes it is also possible to obtain specific desired speed/time curves. For example, two or three diodes connected in series may be selected in such a manner that in the case of a steady temperature rise, the speed will continue to rise slightly, change only insignificantly or even drop a little. In the case of a food processor, the first possibility (slight speed rise) might be desirable because it cannot be excluded that the load current compensation effected by the circuit does not provide full balancing so that the speed would drop more and more as the load rises. However, rising loads always mean rising temperatures in the area of the circuit so that it is an advantage if the rising temperature causes also a rise in speed, due to the temperature compensation, so that a mutual compensation or utilization of the load compensation properties is achieved.

Considering further that the employed integrated circuit IC has a certain mass and, thus, a certain thermal inertia, it is also possible to pick up the ambient temperature by means of an additional temperature sensor, diode or an NTC resistor not shown in the drawing so as to include it in the compensation.

All features mentioned or shown in the above description, the following claims and the drawing may be essential to the invention either alone or in any combination thereof.

I claim:

1. A switch arrangement for circuit making and circuit breaking and controlling the speed of electric devices equipped with an electric motor having armature and field windings comprising means for momentarily braking the motor by reversing the polarity and short-circuiting the field and armature windings of the motor; characterized in that a plurality of input terminals are provided adapted to be connected to respective mains to energize said motor; a double-pole safety reversing switch connected between said motor and at least one of said input terminals and operable between a first switching position to connect said motor between said input terminals to energize said motor, and a second switching position to disconnect said motor from said one input terminal and to connect said field winding across said armature winding to effect a short circuit braking action; speed control means connected between said input terminals and said motor for controlling the speed of said motor, said speed control means including a serially connected selector switch having an off position and at least one run position wherein said selector switch disconnects said motor from said one input terminal when in the off position and connects said motor thereto to operate at a selected speed when in the run position.

2. A switch arrangement according to claim 1, in which said speed control means includes a triac connected in series with said motor, and a phase control network connected with said triac to control the firing point thereof, said selector switch including a plurality of speed terminals connected between an input terminal and said phase control network to control the output signal applied to said triac.

3. Switch arrangement according to claim 2, characterized in that said motor includes a second field winding the safety switch (S) comprising first and second separate change-over switches (S1, S2) and an actuating element, said switches being actuated mechanically by the common actuating element (9), and that the first change-over switch (S1) connects in the second position said first field winding (F1) via the second change-over switch (S2) to the armature winding (A) and said second field winding (F2) in series with said triac (Tc), while the first position of said first change-over switch (S1) separates said first field winding (F1) from the input terminals and connects it directly in series with the armature (A) of the motor (M), and said second partial change-over switch (S2) short-circuits the armature with the said first winding (F1).

4. Switch arrangement according to claim 3, characterized in that the first and second change-over switches (S1, S2) include delay means whereby the circuit-making and circuit-breaking operations of the two switches (S1, S2) are separated in time.

5. Switch arrangement according to claim 4, characterized in that the circuit-making and circuit-breaking operations of said first change-over switch take place within the time required for the switching operations of said second change-over switch.

6. Switch arrangement according to claim 4, characterized in that the said first change-over switch (S1) responds with a certain time lag, relative to the second change-over switch (S2) to the changing-over operation while, conversely, it precedes the said second change-over switch (S2) in the reverse switching operation.

7. Switch arrangement according to claim 1 in which said speed control comprises an a.c. switch and an electric circuit control (IC) and connected in series with the connections of the electric motor, and a housing for said electric circuit control, characterized in that an electric circuit element (NTC resistor, diode D) having a predetermined temperature curve is provided in direct heat-conducting relationship on said housing and connected to said electric circuit control whereby any speed variations caused by the heating of the said electric circuit control are compensated by the concurrent heating of said circuit element.

8. Switch arrangement according to claim 7, in which said electric control circuit comprises an integrated circuit (IC), a plurality of resistors connected with said selector switch, said selector switch being operable to connect different ones of said resistors to said integrated circuit, and said circuit element with predetermined temperature curve is connected with the resistors.

9. Switch arrangement according to claim 7, characterized in that the electric circuit element with predetermined temperature curve comprises an NTC resistor.

10. A switch arrangement according to claim 1, in which said two-pole switch comprises a circuit board, contact pieces, contact piece holders on said circuit board supporting respective ones of said contact pieces, respective wipers for engaging said contact pieces, and at least a first and a second wiper carrier each supporting a different wiper, said wiper carriers being movably mounted on said board and each having a dead-center position, an actuating element for moving said wiper carriers to effect movement of the wipers between said contacts, said actuating element comprising a switch lever movably mounted on said board, and biasing springs engaging said wiper carriers at one end and said lever at the other end to bias said wiper carriers to said dead-center positions, and a lever biasing spring for biasing said lever to a rest position.

11. Switch arrangement according to claim 10, in which said wiper carriers are arranged on the circuit board (20) opposite each other and at a pre-determined distance from each other, said lever including an extension forming with the latter a toggle lever extending between the said wiper carriers for sliding movement.

12. Switch arrangement according to claim 11, in which said double pole switch includes two individual switches, and said switch lever (9) is pivoted at a pivot point (22) outside of the two individual switches (S1, S2) forming the two-pole change-over switch, but on a straight line representing substantially the extension of the two switches (S1, S2) so that different arcs of a circuit and, thus, paths of different length are obtained for the respective pivot points of the two biasing springs (15, 16) on the extension (9a) of the switch lever (9) when the latter is pivoted about its pivot point (22), the biasing springs being fastened to the said extension (9) at opposite points so that when the wiper carriers move into a first dead-center switching position, the said one switch (S2) precedes the said other switch (S1) in this action, while when the switch moves into the other dead-center switching position, the said other switch (S1) precedes the said first switch (S2) in this action.

13. Switch arrangement according to claim 10, wherein the switch lever includes a pin, and the biasing spring (12) for the switch lever (9) is seated on said pin (11) at the switch lever (9) and bears by its other end against the wiper carrier (5) of the said one switch (S2).

14. Switch arrangement according to claim 10, wherein said circuit board includes curved openings and resilient stop pins (13, 14) with lugs (13a, 14a) are provided molded on the said switch lever (9) said pins passing through said curved openings (25, 26) in the circuit board (20) to permit the pivoting movement of the switch lever (9), to secure the switch lever against being lifted off so that the latter can be acted upon either in a direction horizontal to the circuit board (20) or in a direction vertical thereto.

15. Switch arrangement according to claim 3, wherein at least one of the field windings is connected in series with the first and second switches (S1, S2) forming the two-pole change-over switch, said first and second switches including respective wiper connections, said wiper connections of the two changer-over switches (S1, S2) being connected to the respective winding ends, that at least one field winding being connected to said input terminal and, in series with the armature motor winding, while in the other switching position the at least one field winding forms a closed short circuit with the armature winding, delay means for delaying the operation of one of said first and second switches whereby the armature winding is bypassed when the field windings are connected to the input terminals.

16. Switch arrangement according to claim 15, wherein both field windings (W1, W2) are connected in series and have their free ends connected respectively to the single-pole wiper connection of each switch (S1, S2) and that in said first switching position (motor on) the field windings are connected to said input terminals in series with the armature winding, via the change-over switches (S1, S2) while in said second switching position both field windings are short-circuited with the armature winding.

17. Switch arrangement according to claim 15, characterized in that said first field winding (W1) is connected with the respective single-pole wiper connections of the switches (S1, S2) and that in said first switching position the said first field winding (W1) is connected to said input terminals with the armature winding and a second field winding (W1), and in said second switching position only the said first field winding (W1) is short-circuited with the said armature winding (FIG. 4).

18. Switch arrangement according to claim 17, and a resistor (R) connected in series with said winding connection in the short circuit.

19. A switch arrangement as in claim 7, in which said electric circuit element comprises a diode.

* * * * *